United States Patent
Gerhart et al.

(10) Patent No.: US 7,412,316 B2
(45) Date of Patent: Aug. 12, 2008

(54) METHOD FOR SETTING A CLUTCH TORQUE

(75) Inventors: Juergen Gerhart, Appenweier (DE); Olaf Werner, Buehl (DE); Georg Goeppert, Herbolzheim (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 449 days.

(21) Appl. No.: 11/160,723

(22) Filed: Jul. 6, 2005

(65) Prior Publication Data

US 2006/0009900 A1   Jan. 12, 2006

(30) Foreign Application Priority Data

Jul. 10, 2004  (DE) .................. 10 2004 033 489

(51) Int. Cl.
  *G06F 7/00*   (2006.01)
  *F16H 59/00*   (2006.01)
  *B60W 10/02*   (2006.01)
  *F16D 11/00*   (2006.01)

(52) U.S. Cl. ............... 701/51; 701/29; 74/337; 477/174; 477/6; 477/86; 477/166; 477/180; 192/109 R; 192/84.1; 192/53.2

(58) Field of Classification Search .............. 701/67, 701/51, 29; 74/337; 477/174, 6, 70, 166, 477/180; 192/109 R, 84.1, 84.6, 53.2, 54.4, 192/58.61

See application file for complete search history.

(56) References Cited

U.S. PATENT DOCUMENTS 3,588,659 A * 6/1971 Rogers ................ 318/608

(Continued)

FOREIGN PATENT DOCUMENTS

DE   4423102   1/1996

(Continued)

OTHER PUBLICATIONS

Hahn, Jin-Oh. et al., Robust observer-based monitoring of a hydraulic actuator in a vehicle power transmission control system., Nov. 26, 2002., Control Engineering Practice, vol. 10 issue 3, pp. 327-335.*

*Primary Examiner*—Khoi H. Tran
*Assistant Examiner*—Bhavesh Amin
(74) *Attorney, Agent, or Firm*—Simpson & Simpson, PLLC

(57) ABSTRACT

In a method for setting the clutch torque of a clutch, especially a clutch disposed in a drive train of a motor vehicle, the clutch is adjusted using a clutch actuator. This clutch actuator has at least two actuator parts that may be positioned relative to each other at raster values of a position raster. A position setpoint corresponding to a clutch torque and disposed between the raster values of the position raster is calculated, and the actuator parts are positioned relative to each other at a raster value of the position raster that is adjacent to the position setpoint. In addition to the first position raster value, a second position raster value is calculated in such a manner that the position setpoint is disposed between the first position raster value and the second position raster value. The actuator parts are alternately positioned at the first position raster value and the second position raster value in such a manner that the average clutch torque more precisely matches the clutch torque setpoint than the clutch torques of the first and second position raster values.

18 Claims, 4 Drawing Sheets

U.S. PATENT DOCUMENTS

| | | | | |
|---|---|---|---|---|
| 4,561,530 A | * | 12/1985 | Parsons et al. | 477/176 |
| 5,519,605 A | * | 5/1996 | Cawlfield | 700/31 |
| 5,810,144 A | * | 9/1998 | Leimbach et al. | 192/84.6 |
| 6,358,186 B1 | * | 3/2002 | Kosik et al. | 477/176 |
| 6,480,130 B1 | | 11/2002 | Hanson et al. | 341/144 |
| 6,640,951 B2 | * | 11/2003 | Bamberger et al. | 192/85 R |
| 2002/0128763 A1 | * | 9/2002 | Jager et al. | 701/67 |
| 2004/0108829 A1 | | 6/2004 | Betts et al. | 318/696 |
| 2004/0188218 A1 | * | 9/2004 | Berger et al. | 192/90 |

FOREIGN PATENT DOCUMENTS

| | | |
|---|---|---|
| DE | 19723393 | 12/1997 |
| DE | 10131767 | 1/2003 |
| DE | 60006881 | 10/2004 |
| EP | 1270978 | 1/2003 |
| GB | 2 313 885 | 12/1997 |
| WO | WO/02101258 | 12/2002 |

* cited by examiner

METHOD FOR SETTING A CLUTCH TORQUE

CROSS REFERENCE TO RELATED APPLICATIONS

This application claims priority of German Patent Application No. 10 2004 033 489.7, filed Jul. 10, 2004, which application is incorporated herein by reference.

FIELD OF THE INVENTION

The present invention relates to a method for setting the clutch torque of a clutch, especially a clutch disposed in a drive train of a motor vehicle, the clutch being adjusted using a clutch actuator.

BACKGROUND OF THE INVENTION

Methods for setting the clutch torque of a clutch are known in the art. In this context, the clutch actuator has a servomotor that has as actuator parts a stator with a coil and a rotor with permanent magnet sectors that are alternately magnetized in directions opposing each other. The permanent magnet segments produce a rasterization of the actuator parts, i.e., the positions at which the actuator parts are positioned relative to each other while at a standstill are disposed at raster points of a position raster. To move the parts of the clutch toward each other and away from each other and thereby set the clutch torque, the servomotor is in a driving connection with a disengagement device of the clutch via a self-locking mechanism. To set the clutch torque, a corresponding setpoint value is first determined for the relative position of the clutch parts, which may be between the raster values of the position raster. Then, by appropriate supply of power to the coil, the actuator parts are positioned in relation to each other at a raster value of the position raster that is adjacent to the position setpoint value. Upon reaching the raster value, the servomotor is shut down and the current position is kept de-energized because of the self-locking of the clutch actuator. Because of the rasterization of the clutch actuator, the clutch may only be adjusted in steps. As a result, the setting precision of the clutch torque is limited. When a position-regulated servomotor using incremental position measurement is used, the setting precision of the clutch torque may also be influenced by the resolution of the increments if this resolution is coarser than the raster spacing of the rasterizations and/or the raster values of the position raster do not match those of the incremental travel measurement. Finally, because of the elasticity of its components and the friction that occurs during adjustment, the disengagement device is afflicted with a travel hysteresis that results in the relative positioning of the actuator parts not being converted, or being only partially converted, into a corresponding adjusting travel of the clutch. Depending on the particular hysteresis value that exists on the disengagement device and the direction in which the relative adjustment of the clutch parts is made, additional inaccuracies may occur in the setting of the clutch torque.

BRIEF SUMMARY OF THE INVENTION

It is therefore the object of the present invention to create a method for setting the clutch torque of a clutch that enables a high setting precision of the clutch torque.

This objective is achieved in that the clutch is adjusted using a clutch actuator that has at least two actuator parts that may be positioned relative to each other at raster values of a position raster, a position setpoint value for the actuator parts is determined that corresponds to a clutch torque setpoint and is disposed between the raster values of the position raster, the actuator parts are positioned relative to each other at a raster value of the position raster adjacent to the position setpoint, a second position raster value is determined in addition to the first position raster value in such a manner that the position setpoint value is disposed between the first position raster value and the second position raster value, and the actuator parts are alternately positioned at a first position raster value and a second position raster value in such a manner that the average clutch torque more precisely matches the clutch torque setpoint than the clutch torques of the first and second position raster values.

In an advantageous manner, that is, during the period in which the clutch torque setpoint is supposed to be set, the actuator parts are always positioned relative to each other alternately at position raster values disposed on both sides of the actual position setpoint to be set, so that the average value of the clutch torque transmitted by the clutch over this period is between the clutch torques that correspond to the aforementioned position raster values. The method thereby enables a higher setting precision of the clutch torque than a method in which only one position raster value is controlled. In a clutch device that is disposed in a drive train of a motor vehicle, the frequency at which the switching between the position raster values disposed on both sides of the position setpoint value occurs is preferably selected in such a manner that it deviates from the juddering frequency of the drive train so that as much as possible no intrinsic frequencies are excited in the drive train. Advantageously, the frequency selected between the two position raster values is less than the juddering frequency of the clutch and greater than the base frequency of the clutch actuator system as a whole, which comprises, for example, the drive motor, hydraulic section with master cylinder and slave cylinder as well as downstream disengagement mechanics. The base frequency of the system as a whole may also be regarded as the inverse response time of the system as a whole. Furthermore, should the frequency at which the switch between the position raster values disposed on both sides of the position setpoint value occurs be higher than the maximum adjusting frequency of the complete system, which consists of the clutch actuator, the disengagement device of the clutch and a possible signal processing device to determine the position setpoint value of the first and second position raster value and/or to drive the clutch actuator. The maximum frequency with which the switch between the position raster values disposed on both sides of the position setpoint value occurs is limited at the upper end by the adjustment time of the clutch actuator.

In an advantageous embodiment of the invention, a position setpoint signal corresponding to the position setpoint is generated, a heterodyning signal, which contains an alternating signal portion, being heterodyned to this position setpoint signal in such a manner that the sum signal of the position setpoint signal and the heterodyning signal is essentially within the position raster, and the clutch actuator being driven using the sum signal as the setpoint signal. The amplitude of the pulse-width modulation may be freely selected within the range of setting possibilities predetermined by the rasterizations. More favorably, a value is selected at which the vibrations resulting from the pulse-width modulation are not noticed by a user of the motor vehicle located in the interior of the motor vehicle.

In a preferred embodiment of the invention, the heterodyning signal is pulse-width-modulated as a function of the location of the position setpoint relative to the first and second position raster value. In this way an even greater setting precision of the clutch torque is enabled. Practically any desired clutch torque intermediate values may be set between the clutch torques of the first and second position raster values.

In an expedient design of the invention, the heterodyning signal is pulse-width-modulated using a constant period of oscillation, the pulse/pause ratio being altered as a function of the location of the position setpoint relative to the first and second position raster value. The clutch actuator may then be driven in a simple way using a microcomputer, it being possible for the microcomputer to calculate the position setpoints within a fixed clock cycle.

In another embodiment of the invention, the heterodyning signal is pulse-width-modulated using a constant period of oscillation, the pause period ratio being altered as a function of the location of the position setpoint relative to the first and second position raster value. The pulses may then be generated in a simple manner via hardware using a fixed period of oscillation.

However, it is also of course possible for the heterodyning signal to be pulse-width-modulated using a constant pause period, the pulse period ratio being altered as a function of the location of the position setpoint relative to the first and second position raster value.

It is advantageous if the alternating signal portion has a fundamental frequency that lies between 2 and 8 Hz, possibly between 3 and 7 Hz, especially between 4 and 6 Hz and preferably approximately 5 Hz. The fundamental frequency in clutches typical for use in the drive train of a motor vehicle is greater than the maximum adjusting frequency of the complete system, which comprises a clutch actuator, disengagement device and signal processing device, and less than the juddering frequency of the drive train.

The aforementioned object is also achieved in that the clutch is adjusted using a clutch actuator that is in a drive connection with the clutch via a disengagement device that has a travel hysteresis, a position setpoint is calculated corresponding to a clutch torque setpoint and the clutch actuator is positioned corresponding to the position setpoint, and the juddering movement is heterodyned to the positioning movement of the clutch actuator for at least partial compensation of the travel hysteresis.

In this context—similar to the solution that was first described—the clutch actuator, via the juddering movement of the clutch actuator, is briefly positioned past the position setpoint and then back a little in the opposite direction, this sequence of positioning steps being repeated one or more times. This forward/reverse movement is able to reduce or even completely eliminate any travel hysteresis that may be present. Therefore, the method enables a setting of the clutch torque with great precision.

It is advantageous if the amplitude of the juddering movement is at least twice as great as the maximum value of the travel hysteresis. Even in the worst-case scenario, if the clutch actuator and the disengagement device are positioned in such a manner that without the use of the juddering movement the full travel hysteresis would be noticeable, the juddering movement enables a complete compensation of the travel hysteresis. Preferably, the amplitude of the juddering movement is selected to be just large enough that the juddering movement is not noticed by the vehicle occupants.

In an expedient embodiment of the method, a position setpoint signal corresponding to the position setpoint is generated, a heterodyning signal for the juddering movement that contains an alternating signal portion being heterodyned to this position setpoint signal, and the clutch actuator being driven using the signal formed in this way. As a result, the juddering movement may be produced in a simple manner.

It is advantageous that the alternating signal has a frequency that is larger than 25 Hz, especially 30 Hz and preferably 35 Hz. The frequency of the alternating signal portion is then higher than the maximum adjusting frequency of the complete system, which comprises a clutch actuator, disengagement device, clutch and signal processing device, but lower than the maximum adjusting frequency of the clutch actuator.

BRIEF DESCRIPTION OF THE DRAWINGS

Exemplary embodiments of the invention are explained in detail below in reference to the drawing. In the drawing.

DETAILED DESCRIPTION OF THE INVENTION

Figure 1:
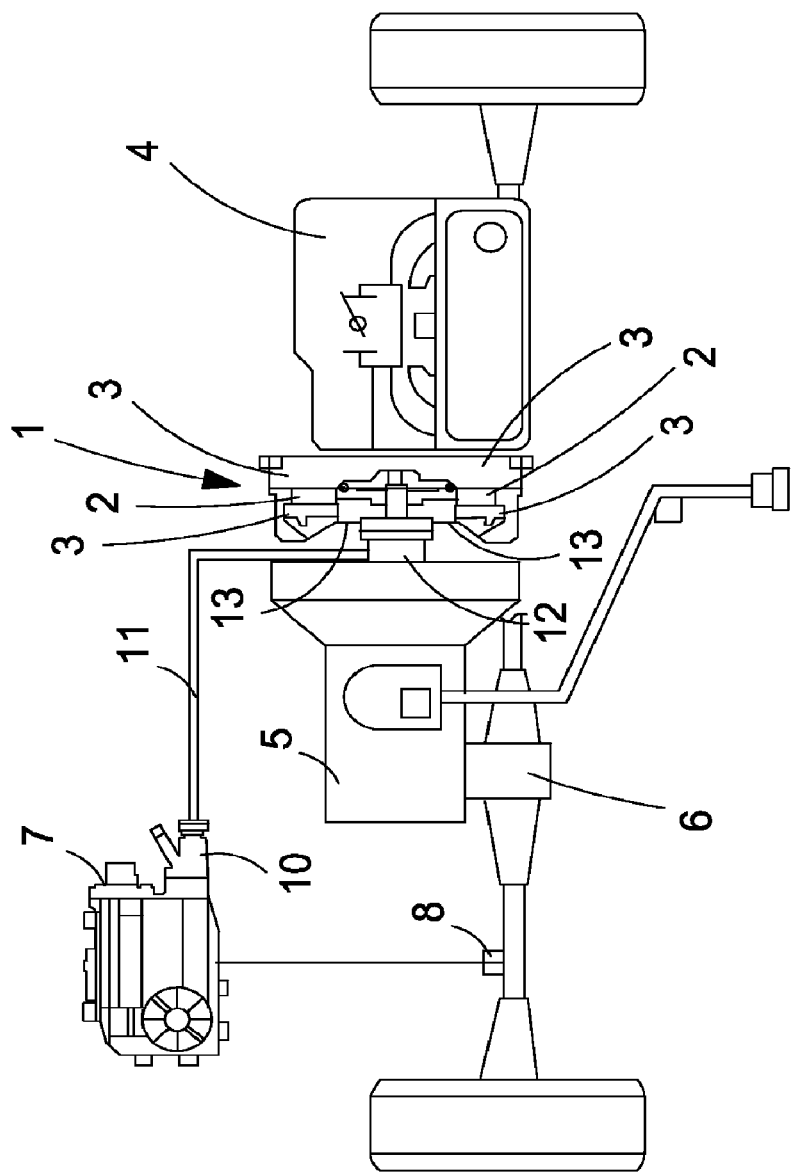
FIG. 1 shows a drive train of a motor vehicle.

A clutch device disposed in a drive train of a motor vehicle that is schematically depicted in FIG. 1 has a clutch 1, which comprises a clutch disk 2 with a friction lining and two pressure elements 3 disposed on both sides of clutch disk 2 that are movable toward and away from each other. Pressure elements 3 are connected to the shaft of an internal combustion engine 4 and clutch disk 2 is connected to the drive shaft of a manual transmission 5. An output shaft of manual transmission 5 is in a drive connection with the driving wheels of the motor vehicle via a differential 6.

The actuation device has a clutch actuator 7 that is configured as an EC motor. Clutch actuator 7 comprises an actuator having a stator with a coil and a rotor that is rotatably mounted on the stator and has a series of permanently magnetized magnet segments on its perimeter that are alternately magnetized in directions opposed to each other and cooperate with the stator magnetically across an air gap. To position the rotor relative to the stator, the coil of clutch actuator 7 is connected to a controller via an output stage. As position sensors, a plurality of magnetic field sensors (not shown) that are offset in relation to each other in the circumferential direction and cooperate with the magnet segments of the rotor are provided on the stator. For incremental measurement of the relative position between the rotor and the stator and to control the commutation of the coil as a function of the measured relative position, the magnetic field sensors are connected to measurement signal inputs of the controller. Moreover, at least one wheel speed sensor 8 is connected to the controller.

The rotor has certain preferred positions that define a position raster. In the de-energized state, the rotor position takes one of the raster values 9a, 9b, 9c of the position raster of which some are marked by dashed lines in FIG. 2. If the rotor is positioned between two raster values 9a, 9b, 9c, a latching torque occurs between the rotor and the stator that is caused by the magnet segments of the rotor magnetically cooperating across the air gap with the teeth disposed on the stator. By energizing the coil, the rotor may be positioned at any of the raster values of the position raster.

In FIG. 1, it is recognizable that clutch actuator 7 is in drive connection with clutch 1 via a disengagement device. The disengagement device has transmission gearing driven by a clutch actuator 7 that is in drive connection with master cylinder 10, which is connected via hydraulic line 11 to a slave cylinder 12. Master cylinder 12 is in drive connection with pressure elements 3 for adjusting the torque transmitted by clutch 1 against the return force of a diaphragm spring 13.

Using the controller, the rotor may be positioned relative to the stator at any of the raster values of the position raster. To set a clutch torque setpoint that is calculated using the controller and is to be transmitted via clutch 1 from the shaft of the internal combustion engine 4 to the drive shaft of manual transmission 5, a position setpoint is first calculated in the control device. The corresponding position setpoint signal is designated as 14 in FIG. 2. If the position setpoint matches one of the raster values 9a, 9b, 9c of the position raster, the clutch actuator is positioned at the corresponding raster value 9a, 9b, 9c.

If, on the other hand, the position setpoint does not match any of the raster values 9 of the position raster, at least one first raster value 9a and at least one second raster value 9b are calculated that surround the position setpoint on either side. Then, the actuator parts for the period in which the corresponding clutch torque is to be set, are alternately positioned at first position raster value 9a and second position raster value 9b in such a manner that the average clutch torque matches the clutch torque setpoint.

Figure 2:
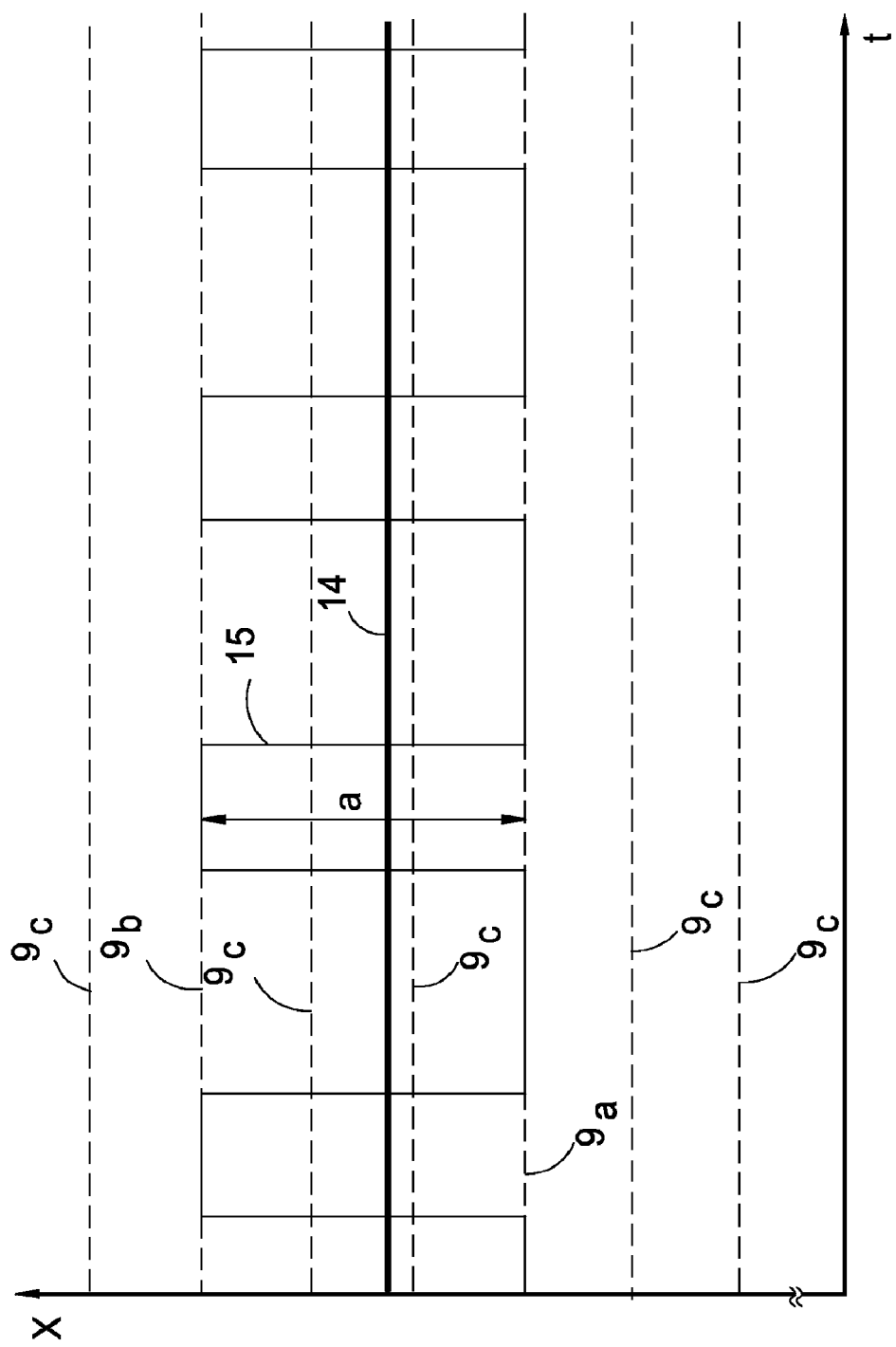
FIG. 2 shows a graphical representation of the relative position of two actuator parts of a clutch actuator, time t being shown on the abscissa and position x being shown on the ordinate, and dashed-line raster values of a position raster being marked in which the actuator parts may be positioned in relation to each other.

In FIG. 2 it is recognizable that for this purpose a pulse-width-modulated heterodyning signal containing an alternating signal portion is heterodyned to position setpoint signal 14 in such a manner that sum signal 15 from position setpoint signal 14 and the heterodyning signal is between its flanks in the position raster. In FIG. 2, the amplitude of the alternating signal portion is designated by the reference character a. Clutch actuator 7 is positioned in accordance with sum signal 15, which is obtained in this manner.

In FIG. 2 it is recognizable that the pulse/pause ratio and the raster values 9a, 9b are harmonized with each other in such a manner that the integral of sum signal 15 matches the corresponding integral of position setpoint signal 14 over the period of the alternating signal portion.

The fundamental frequency of the alternating signal portion is set far enough apart from the juddering frequency of the drive train that no intrinsic frequencies are excited in the drive train by the alternating signal portion. Moreover, the fundamental frequency is between the maximum adjusting frequency of the complete system, which comprises clutch actuator 7, the disengagement device of clutch 1 and the controller, and the maximum adjusting frequency of the clutch actuator.

Figure 3:
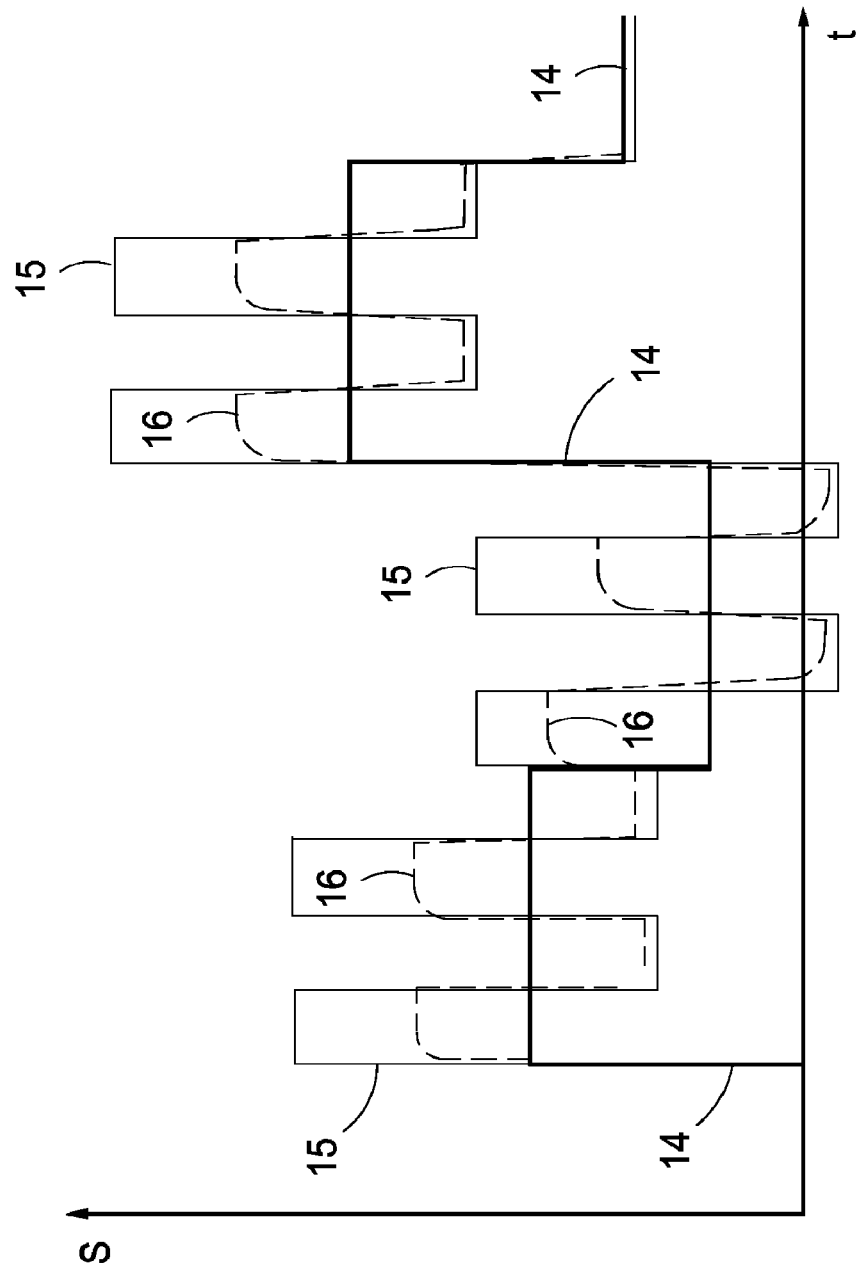
FIG. 3 shows a graphical representation of the relative position of two clutch parts of a wet or dry clutch, time t being shown on the abscissa and position s being shown on the ordinate, the setpoint of the relative position being shown as a continuous boldface line, a setpoint value heterodyned with a juddering movement being shown as a continuous thin line, and the actual value of the relative position being shown as a dotted line; and, FIG. 4 shows a graphical representation of the relative position of two clutch parts of a wet or dry clutch, time t being shown on the abscissa and position s being shown on the ordinate, the setpoint of the relative position being shown as a continuous boldface line, an average actual value of the relative position being shown as a continuous thin line and the actual value of the relative position as it would be without the juddering movement being shown as a dotted-and-dashed line.
Figure 4:
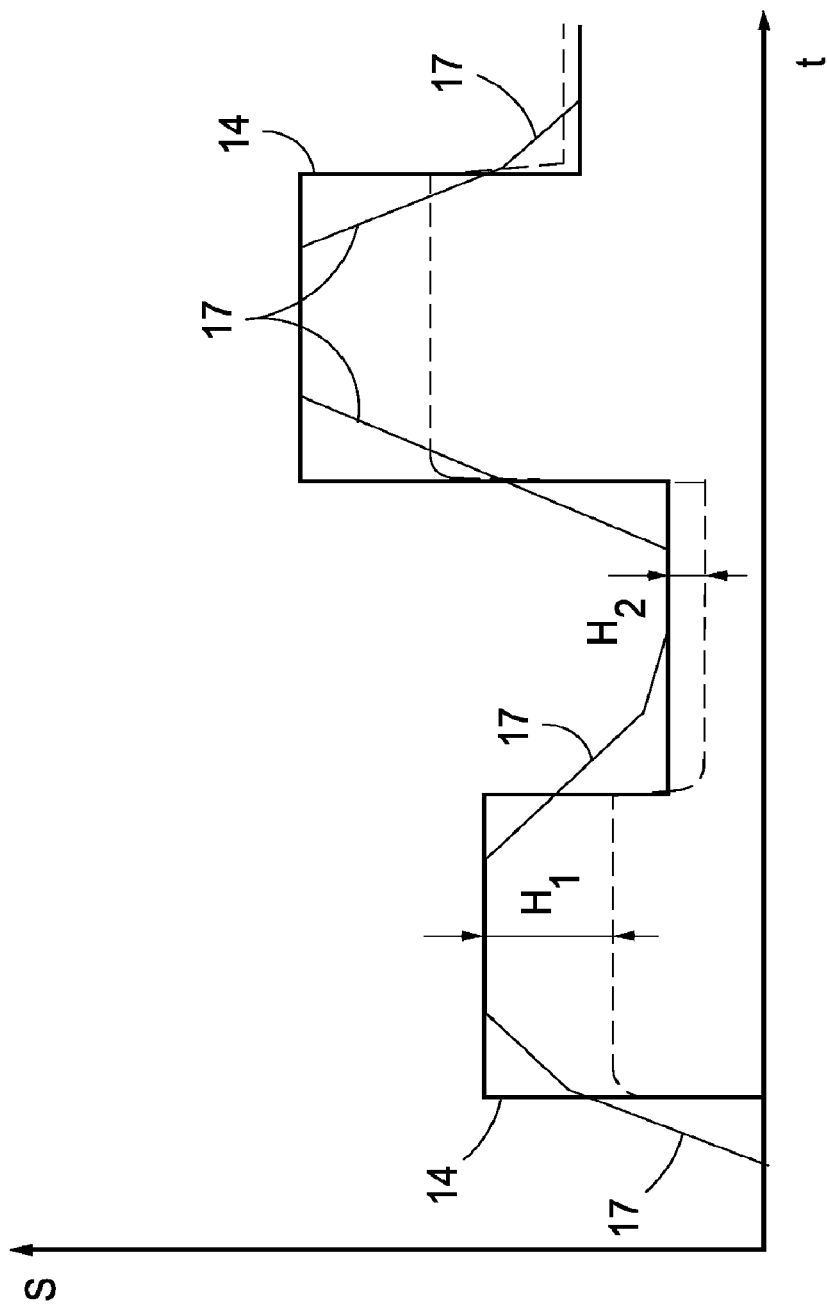

In the exemplary embodiment shown in FIGS. 3 and 4, the disengagement device has a travel hysteresis. In FIG. 4 it is evident that in the positioning of clutch actuator 7, which is controlled by position setpoint signal 14, deviations between position setpoint signal 14 and the actual—shown by dashed lines—relative position of the clutch parts that are based on hysteresis deviations $H_1$ and $H_2$ may result. In this context, the former deviations are a function of the time-related curve of the relative position of the clutch parts in the past. Clearly it is recognizable that the travel hysteresis during the positioning assumes different successive travel hysteresis values $H_1$, $H_2$. In FIG. 3, it is assumed for the sake of simplification that the gear ratio between the positioning travel of clutch actuator 7 and the positioning travel of pressure element 3 of clutch 1 is equal to one. Actually, however, the transmission ratio has a value that is greater than one, i.e., the positioning travel of clutch actuator 7 is translated into a smaller positioning travel of clutch 1 using the disengagement device.

In order to compensate the travel hysteresis at least partially, or even completely prevent it, a juddering movement is heterodyned to the positioning movement of clutch actuator 7. For this purpose, a pulse-width-modulated heterodyning signal whose amplitude is at least twice as great as the maximum value of the travel hysteresis is heterodyned to position setpoint signal 14. The pulse/pause ratio of the pulse-width modulation is approximately 50%. In FIG. 3 it is evident that although actual value curve 16 of the relative position of pressure element 3 deviates from sum signal 15, which is formed from position setpoint signal 14 and the hysteresis signal, because of the hysteresis, average value 17 of sum signal 15 (FIG. 4) nevertheless matches position setpoint signal 14 relatively well over the period of the heterodyning signal.

The fundamental frequency of the alternating signal portion in the exemplary embodiment according to FIG. 3 is higher than the maximum adjusting frequency of the complete system, which comprises clutch actuator, disengagement device, clutch 1 and controller, but lower than the maximum adjusting frequency of the clutch actuator.

LIST OF REFERENCE CHARACTERS

1 Clutch
2 Clutch disk
3 Pressure element
4 Combustion engine
5 Manual transmission
6 Differential
7 Clutch actuator
8 Wheel speed sensor
9a First raster value
9b Second raster value
9c Raster value
10 Master cylinder
11 Hydraulic line
12 Slave cylinder
13 Diaphragm spring
14 Position setpoint signal
15 Sum signal
16 Actual value curve
17 Average value of the sum signal
a Amplitude of the alternating signal
$H_1$ Travel hysteresis value
$H_2$ Travel hysteresis value

What is claimed is:

1. A method for setting a clutch torque of a clutch, which is disposed in a drive train of a motor vehicle, the clutch (1) being adjusted using a clutch actuator (7) that has at least two actuator parts that may be positioned relative to each other at raster values (9a, 9b, 9c) of a position raster, a position setpoint being determined for the actuator parts that corresponds to a clutch torque and is disposed between the raster values (9a, 9b, 9c) of the position raster, and the actuator parts being positioned relative to each other at a raster value (9a) of the position raster adjacent to the position setpoint, wherein a second position raster value (9b) is determined in addition to a first position raster value (9a) in such a manner that the position setpoint is disposed between the first position raster value (9a) and the second position raster value (9b), and the actuator parts are alternately positioned at the first position raster value (9a) and the second position raster value (9b) in such a manner that a average clutch torque more precisely matches the clutch torque setpoint than the clutch torques of the first and second position raster values (9a, 9b).

2. The method as described in claim 1, wherein a position setpoint signal (14) is generated that corresponds to the position setpoint, a heterodyning signal containing an alternating signal portion is heterodyned to this position setpoint signal (14) in such a manner that the sum signal from the position setpoint signal (14) and the heterodyning signal is essentially within the position raster, and the clutch actuator (7) is driven with the sum signal as setpoint signal.

3. The method as described in claim 1, wherein the heterodyning signal is pulse-width-modulated as a function of the location of the position setpoint relative to the first and second position raster values (9a, 9b).

4. The method as described in claim 1, wherein the heterodyning signal is pulse-width-modulated using a constant period of oscillation, and the pulse/pause ratio is altered as a function of the location of the position setpoint relative to the first and second position raster values (9a, 9b).

5. The method as described in claim 1, wherein the heterodyning signal is pulse-width-modulated using a constant period of oscillation, and the pause duration is altered as a function of the location of the position setpoint relative to the first and second position raster values (9a, 9b).

6. The method as described in claim 1, wherein the heterodyning signal is pulse-width-modulated using a constant pause period, and the period of oscillation is altered as a function of the location of the position setpoint relative to the first and second position raster values (9a, 9b).

7. The method as described in claim 1, wherein the alternating signal portion has a fundamental frequency that is set between a system-specific juddering frequency of the clutch and a system-specific base frequency of the system of the clutch actuator as a whole.

8. The method as described in claim 7, wherein the fundamental frequency is 1 to 10 Hz.

9. A method for setting the clutch torque of a clutch (1), which is disposed in a drive train of a motor vehicle, which is described in claim 1, the clutch (1) being adjusted using a clutch actuator (7) that is in a drive connection with the clutch (1) via a disengagement device having a travel hysteresis, and a position setpoint corresponding to a clutch torque setpoint being calculated and the clutch actuator (7) being positioned corresponding to the position setpoint, wherein a juddering movement is heterodyned to the positioning movement of the clutch actuator (7) for at least partial compensation of the travel hysteresis.

10. The method as described in claim 9, wherein the amplitude of the juddering movement is at least twice as large as the maximum value of the travel hysteresis.

11. The method as described in claim 9, wherein a position setpoint signal (14) corresponding to the position setpoint is generated, a heterodyning signal for the juddering movement that contains an alternating signal portion is heterodyned to this position setpoint signal (14), and the clutch actuator (7) is driven using the signal formed in this way.

12. The method as described in claim 9, wherein the alternating signal portion has a frequency that is higher than the juddering frequency.

13. The method as described in claim 12, wherein the frequency is higher than 25 Hz.

14. The method as described in claim 13, wherein the frequency is 30 Hz.

15. The method as described in claim 13, wherein the frequency is 35 Hz.

16. The method as described in claim 8, wherein the fundamental frequency is 3 to 7 Hz.

17. The method as described in claim 16, wherein the fundamental frequency is 4 to 6 Hz.

18. The method as described in claim 17, wherein the fundamental frequency is approximately 5 Hz.

* * * * *